(12) United States Patent
Haynes et al.

(10) Patent No.: US 6,332,906 B1
(45) Date of Patent: Dec. 25, 2001

(54) ALUMINUM-SILICON ALLOY FORMED FROM A METAL POWDER

(75) Inventors: Tom Haynes, Midlothian; Kevin Anderson, Richmond, both of VA (US)

(73) Assignee: California Consolidated Technology, Inc., Huntington Beach, CA (US)

( * ) Notice: Subject to any disclaimer, the term of this patent is extended or adjusted under 35 U.S.C. 154(b) by 0 days.

(21) Appl. No.: 09/046,336

(22) Filed: Mar. 24, 1998

(51) Int. Cl.[7] ............ C22C 1/04; C22C 21/08; B22F 3/16; B22F 3/20

(52) U.S. Cl. .............. 75/249; 419/28; 419/39; 419/42; 419/60

(58) Field of Search ............. 428/694 ST, 65.6, 428/457, 544, 546, 900; 419/60, 23, 28, 49, 54, 41, 39, 42; 75/249; 360/265.7, 265.9, 244.2, 235.3

(56) References Cited

U.S. PATENT DOCUMENTS

| | | |
|---|---|---|
| 1,944,183 | 1/1934 | Kempf et al. .............. 148/21.1 |
| 2,727,996 | 12/1955 | Rockwell et al. ............ 250/108 |
| 3,000,802 | 9/1961 | Worn et al. .............. 204/154.2 |
| 3,325,279 | 6/1967 | Lawrence et al. .............. 75/148 |
| 3,736,128 | 5/1973 | de Cadenet et al. ............ 75/126 |
| 3,795,042 | 3/1974 | Kreider et al. ............. 29/472.3 |
| 4,198,322 | 4/1980 | Storm .................... 252/478 |
| 4,213,883 | 7/1980 | Owens ................... 252/478 |
| 4,218,622 | 8/1980 | McMurtry et al. ............ 250/518 |
| 4,225,467 | 9/1980 | McMurtry et al. ............ 252/478 |
| 4,275,174 | 6/1981 | Tadokoro et al. ............... 525/1 |
| 4,277,680 | 7/1981 | Rodriguez et al. ............ 250/358 |
| 4,292,528 | 9/1981 | Shaffer et al. .............. 250/506 |
| 4,293,598 | 10/1981 | Hortman et al. ............. 427/203 |
| 4,297,976 | 11/1981 | Bruni et al. ............... 123/193 |
| 4,430,387 | 2/1984 | Nakagawa et al. ........... 428/549 |
| 4,437,013 | 3/1984 | Hondorp ................. 250/515 |
| 4,447,729 | 5/1984 | Doroszlai et al. ........... 250/506.1 |
| 4,453,081 | 6/1984 | Christ et al. ............. 250/506.1 |
| 4,474,728 | 10/1984 | Radford .................. 376/339 |
| 4,522,744 | 6/1985 | Argall et al. .............. 252/478 |
| 4,569,822 | 2/1986 | Brown et al. ............... 419/23 |
| 4,595,559 | 6/1986 | Planchamp ................ 420/528 |
| 4,603,665 | 8/1986 | Hesterberg et al. ........... 123/195 |
| 4,605,440 | 8/1986 | Halverson et al. ............ 75/238 |
| 4,615,735 | 10/1986 | Ping ..................... 75/249 |
| 4,644,171 | 2/1987 | Mollon ................. 250/518.1 |
| 4,705,095 | 11/1987 | Gaspar ................... 164/463 |
| 4,711,823 | 12/1987 | Shiina ................... 428/547 |
| 4,722,872 | * 2/1988 | Westerman ............... 428/654 |
| 4,744,922 | 5/1988 | Blakely et al. ............. 252/478 |
| 4,751,021 | 6/1988 | Mollon et al. ............. 252/478 |
| 4,806,307 | 2/1989 | Hirose et al. .............. 420/528 |
| 4,818,308 | 4/1989 | Odani et al. ............... 148/437 |
| 4,821,694 | 4/1989 | Hesterberg et al. ........... 123/195 |
| 4,826,630 | 5/1989 | Radford et al. ............. 252/478 |
| 4,840,763 | * 6/1989 | Freitag .................... 264/65 |
| 4,853,179 | 8/1989 | Shiina ................... 419/28 |
| 4,865,645 | 9/1989 | Planchamp ................ 75/244 |

(List continued on next page.)

FOREIGN PATENT DOCUMENTS 612045    1/1961   (CA) .

OTHER PUBLICATIONS

Wu et al., "Microstructure and Mechanical Properties of Spray–Deposited AL–17Si–4.5Cu–0.6Mg Wrought Alloy," Metallurgical and Materials Transactions A, vol. 26A, May, 1995, pp. 1235–1246.

*Primary Examiner*—Daniel J. Jenkins
(74) *Attorney, Agent, or Firm*—David J. Serbin

(57) ABSTRACT

Aluminum-silicon alloys having high stiffness are used in forming computer memory disks and actuator arms. Disks formed with the alloy have low flutter and can be spun at 12,000 RPM or greater with a flutter of 10 Å or less.

26 Claims, 2 Drawing Sheets

U.S. PATENT DOCUMENTS

| | | | |
|---|---|---|---|
| 4,865,769 | 9/1989 | Anayama | 252/478 |
| 4,938,810 | 7/1990 | Kiyota et al. | 148/437 |
| 4,992,242 | 2/1991 | Faure | 420/535 |
| 5,049,450 | 9/1991 | Dorfman et al. | 428/570 |
| 5,057,150 | 10/1991 | Reeve et al. | 75/671 |
| 5,156,804 | 10/1992 | Halverson et al. | 376/419 |
| 5,169,462 | 12/1992 | Morley et al. | 148/439 |
| 5,234,514 | 8/1993 | Donahue et al. | 148/549 |
| 5,273,709 | 12/1993 | Halverson et al. | 419/45 |
| 5,278,251 * | 1/1994 | Ohtani et al. | 525/309 |
| 5,312,582 * | 5/1994 | Donado | 419/19 |
| 5,333,156 | 7/1994 | Lemercier | 376/211 |
| 5,366,691 | 11/1994 | Takeda et al. | 420/548 |
| 5,391,522 | 2/1995 | Goto et al. | 501/4 |
| 5,416,333 | 5/1995 | Greenspan | 250/515.1 |
| 5,437,746 | 8/1995 | Usui et al. | 148/439 |
| 5,441,554 | 8/1995 | Romero et al. | 75/255 |
| 5,444,587 * | 8/1995 | Johnson et al. | 360/104 |
| 5,478,220 | 12/1995 | Kamitsuma et al. | 418/552 |
| 5,506,055 | 4/1996 | Dorfman et al. | 428/407 |
| 5,532,194 | 7/1996 | Kawashima et al. | 501/9 |
| 5,551,997 * | 9/1996 | Marder et al. | 148/437 |
| 5,554,428 | 9/1996 | Bartges et al. | 428/641 |
| 5,561,829 | 10/1996 | Sawtell et al. | 419/3 |
| 5,586,926 | 12/1996 | Wedell et al. | 451/59 |
| 5,613,189 | 3/1997 | Carden | 428/565 |
| 5,624,475 | 4/1997 | Nadkarni et al. | 75/238 |
| 5,626,935 | 5/1997 | Goto et al. | 428/64.1 |
| 5,669,059 | 9/1997 | Carden | 419/12 |
| 5,675,430 * | 10/1997 | Ishizuka et al. | 359/216 |
| 5,700,962 | 12/1997 | Carden | 75/236 |
| 5,712,014 | 1/1998 | Carden | 428/65.6 |
| 5,722,033 | 2/1998 | Carden | 419/12 |
| 5,722,036 * | 2/1998 | Shikata et al. | 419/38 |

* cited by examiner

ALUMINUM-SILICON ALLOY FORMED FROM A METAL POWDER

TECHNICAL FIELD

The present invention lies in the art of metallurgy, and more specifically in the field of alloy compositions produced by powder metallurgy. In particular, the invention is directed to articles formed from aluminum-silicon alloys having a defined microstructure.

BACKGROUND OF THE INVENTION

Various techniques for forming high performance metal alloys by powder metallurgy are known. Generally, these techniques involve forming a metal powder or particulate by atomizing a melt of the alloy, and then cooling the atomized alloy stream to effect solidification. Oftentimes, this process results in an alloy having a microstructure unachievable using more conventional techniques such as casting. It is thus possible to produce alloys having unusual physical properties.

Various applications might benefit from the improved physical properties afforded by metal powder materials. One of these applications is memory disk drives used in computers, commonly referred to as "hard disks" or simply "disk drives." Disk drives are formed of multiple parallel spaced disks each having a metallic substrate, usually nickel plated aluminum, with a magnetic coating. In use, the disks are rotated at high speeds, and an actuator arm scans over each disk to read and write digital programming.

Disk performance (i.e., memory capacity and read/write speed) is a function of the disk rotational speed. The faster the disks rotate, the greater the performance. Much effort has therefore been focused on the goal of increasing the disk speed.

However, achievement of this goal has been elusive. Currently, the upper limit on disk speed is approximately 7200 rpm using the industry standard 5000 series (5XXX) monolithic aluminum disk substrate. This upper limit is dictated by practical limitations on the amount of flutter permissible. Flutter is a phenomenon whereby the revolving disk begins to wobble above a certain rotational speed. If severe enough, flutter will result in the disk impacting against the actuator arm, which in turn may damage the disk and cause the disk drive to break down or "crash." Minimal flutter is therefore a prerequisite for preventing disk drive crashes and/or allowing higher disk speeds.

Several factors contribute to flutter. One is resonance caused by the interaction of the natural frequency of the disk and its rotational speed. The higher the natural frequency, the higher the rotational speed possible without resonance. The easiest way to increase the natural frequency of the disk, and hence "shift" the resonance point to a higher rotational speed, is to increase disk stiffness. Another factor influencing flutter is disk unevenness. Generally, the more uneven the disk surface, the greater the amount of wobble or flutter at a given rotational speed.

Hence, two desirable attributes of a metallic disk material are high stiffness and the ability to be highly machined and polished to a flat surface, thereby providing a high natural frequency and smooth surface finish. Furthermore, flutter can be attenuated by dampening factors contributed by composite materials. A ceramic material incorporated into a matrix (e.g. aluminum) provides a dampening factor which is a function of the interfacial surface area of the particles and the matrix. As the interfacial surface area increases, so does the dampening factor.

Various metal alloys and composite materials are known to have increased stiffness compared to monolithic aluminum. For several reasons, however, these materials are not wholly satisfactory for use in computer disks. For example, it is known to manufacture disks of silicon carbide or boron carbide in an aluminum matrix alloy. These composite materials are very stiff, having a modulus of about 14–30 msi. However, they are also very difficult to grind and polish to obtain a flat surface. Grinding rates are dramatically reduced compared to those for monolithic aluminum when using conventional grinding apparatus. This alone makes silicon carbide and boron carbide alloys impractical for commercial use in manufacturing computer disks. Another problem with polishing known prior art alloy materials is the hardness of the discontinuous phase. Grinding quickly dulls cutting tools and results in galling of the aluminum matrix. In addition, boron carbide or silicon carbide particles are literally pulled out of the aluminum matrix at the grinding surface, resulting in increased surface porosity.

In addition to minimizing flutter, a highly polished surface is necessary for proper coating of the substrate disk with a nickel plating. Without a highly polished surface, the plating will not be uniform. Gaps formed in the plating due to the lack of uniformity cause the subsequently applied magnetic coating to have imperfections, which in turn interfere with disk function.

A prior art process for forming metal alloyed memory disks is disclosed in U.S. Pat. No. 5,554,428. This patent teaches an aluminum alloy having various alloying elements such as zinc, copper, and dispersoid-forming elements of which scandium is one example. Disks are formed using casting and rolling.

U.S. Pat. No. 5,437,746 relates to a process for forming an aluminum alloy sheet which employs forming the aluminum alloy into an ingot or continuously cast thin sheet coil, followed by optional hot rolling, cold rolling and punching the alloy to produce a blank disk. The alloy includes magnesium, zinc, and copper.

The disks formed by these processes suffer from many of the disadvantages noted above. Hence, there remains a need in the art for a method for forming a disk having high stiffness and superior polishing characteristics. It would further be advantageous to manufacture actuator arms and various other components of a disk drive form the same or similar high stiffness alloy.

SUMMARY OF THE INVENTION

It is accordingly an aspect of the invention to provide an article formed from an aluminum powder alloy having high stiffness.

It is another aspect of the invention to provide an article formed from an aluminum powder alloy having grindability and polishing characteristics similar or superior to monolithic aluminum.

It is yet another aspect of the invention to provide an article formed from an aluminum powder alloy having platability characteristics similar to monolithic aluminum.

It is still another aspect of the invention to provide a memory disk substrate having the above characteristics of stiffness, grindability and platability, which can be polished and plated using conventional apparatus designed for use with monolithic aluminum.

It is yet another aspect of the invention to provide a memory disk substrate having a dampening factor which attenuates flutter.

It is still another aspect of the invention to provide a memory disk substrate capable of forming a memory disk with the ability to spin at up to 12,000 rpm or greater with a flutter of 10 Å or less.

It is yet another aspect of the invention to provide an actuator arm for a computer disk drive having stiffness characteristics similar to the above memory disk.

These aspects and others set forth hereinbelow, are achieved by an extruded article formed by a process comprising the steps of (a) forming particulates comprising from about 20 to about 40% by weight silicon, up to 4% by weight magnesium and the balance aluminum, the particulates having a particle size of from about 18 to about 35 microns which comprises a microstructure of silicon particles of from about 1 to about 10 microns in a continuous aluminum phase, (b) compacting the particulates in a mold, (c) subjecting the compacted particulates to a vacuum of less than about 10 torr of pressure, to remove air and other gaseous material from between the particulates in the mold, (d) isostatically compressing the particulates at a pressure of at least about 30,000 psi and at a temperature of less than about 100° C., thereby forming a green billet, (e) vacuum sintering the billet under a vacuum of less than about 100 torr of pressure and/or an inert gas environment at a temperature less than that which substantially effects the particulate microstructure, thereby forming a sintered billet, (f) extruding the sintered billet and forming metal to metal bonds between the sintered particulates.

The aspects of the invention are also achieved by an alloy comprising sintered particulates of aluminum, silicon, and magnesium with an overall composition of 20 to 40% silicon, up to 4% magnesium, and the balance aluminum, and having a particle size of from about 18 to about 35 microns, and having a microstructure comprising silicon particles of from about 1 to about 10 microns in a continuous aluminum matrix.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

Figure 1:
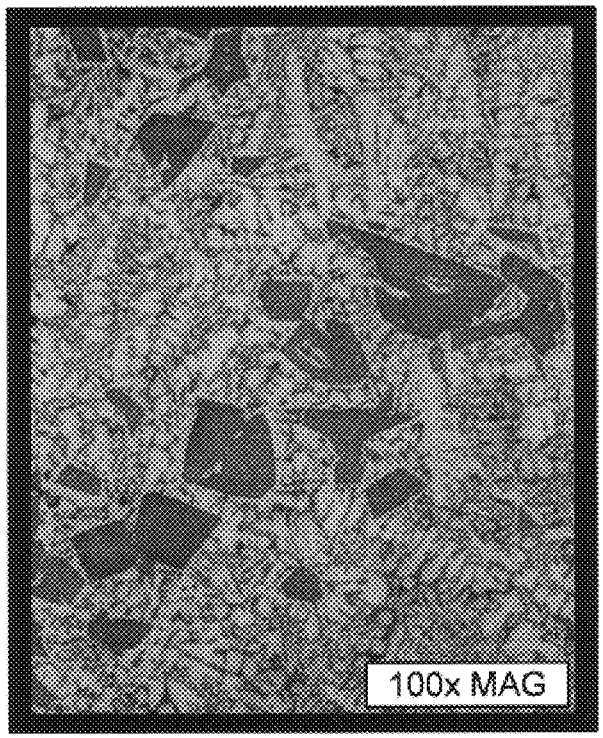
FIG. 1 is a photomicrograph of the microstructure of a prior art aluminum alloy.

The alloy of the present invention is formed by a powder metallurgy process in which particulates of an aluminum/ silicon alloy having a well defined microstructure are sintered and subsequently processed to form articles having unique physical characteristics, including high stiffness, excellent polishing characteristics, and significant vibration dampening. The aluminum alloy of the present invention is suitable for use in a number of applications, including the preparation of metal substrates for computer memory disks and actuator arms, disk hubs, spacers and other computer disk drive components where stiffness and/or dampening are important.

The aluminum alloy of the invention has an overall composition, on a weight basis, of from about 20 to about 40% or greater silicon, up to about 4% magnesium, up to about 5% copper, and the balance aluminum. The amount of copper is desirably less than about 4%, preferably less than about 2%, and most preferably less than about 0.5%. In a highly preferred embodiment, the amount of copper is less than about 0.05% by weight. The amount of magnesium is desirably less than about 3% and greater than about 0.5% by weight, and preferably less than about 2.5% and greater than about 1% by weight. The amount of silicon can vary depending on the stiffness desired. Generally, the greater the level of silicon, the greater the stiffness. If the alloy is extruded, the upper limit on silicon is generally about 40%. Above this level, flow stresses in the extrusion equipment become excessive for most tooling materials. However, silicon levels above 40% are within the scope of the present invention provided that tooling materials are employed which can handle the flow stress as generated. Generally, the amount of silicon is at least about 15%. In preferred embodiments, the amount of silicon is from about 22% to about 30%, and in highly preferred embodiments, the amount of silicon is from about 24% to about 28%.

Particulates having the above composition are formed by a powder metallurgy technique which involves atomizing an alloy melt, and rapidly cooling the atomized alloy to form particulates. In a preferred embodiment, the atomization takes place by passage of the alloy in liquid form through a spray nozzle producing atomized particulates having a particle size of from about 15 to about 45 microns. As the particles leave the spray nozzle head, they are cooled by a stream of inert gas which lowers the temperature of the particles at a rate of from about 1292° F.–2732° F. (700° C.–1500° C.) per second. Desirably the rate of cooling is from about 1562° F.–2250° F. (850° C.–1250° C.) and preferably from about 1742° F.–1922° F. (950° C.–1050° C.). In a highly preferred embodiment, the rate of cooling is about 1832° F. (1000° C.) per second. At these very high rates of cooling, the particulates undergo solidification under non-equilibrium conditions, i.e. there is no little or no significant molten phase aggregation of silicon. Hence, the resulting microstructure of the alloy comprises small particles of silicon and other alloying elements. By contrast, in conventional techniques such as casting, cooling rates are on the order of 1° C. per second, which allows significant time for agglomeration or aggregation of silicon and/or other alloying elements such that the crystalline microstructure of the resulting particulates includes relatively large domains of the alloying elements.

Figure 2:
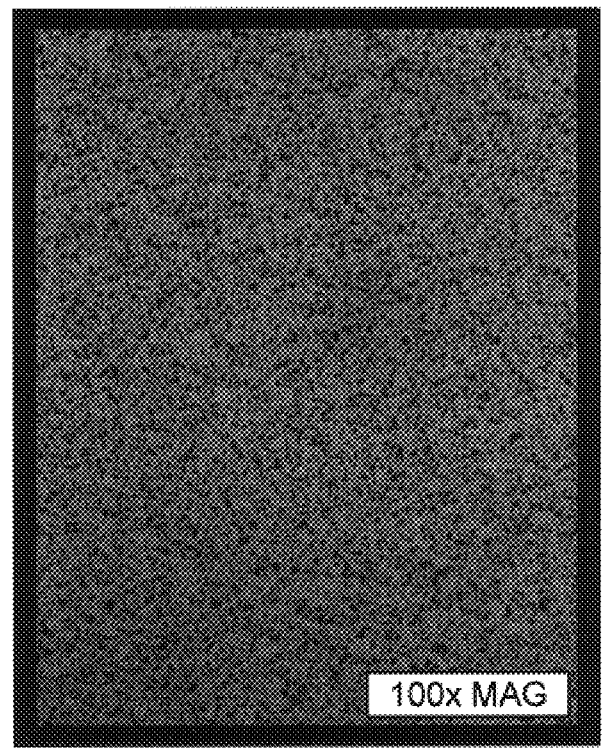
FIG. 2 is a photomicrograph of an aluminum alloy of the invention.

FIGS. 1 and 2 show a comparison of crystalline microstructures using a prior art casting technique and the powder metallurgy technique of the present invention. As can be seen in FIG. 1, a casting technique exhibits silicon particles in the aluminum matrix which are quite large, on the order of 90 μm. As illustrated in FIG. 2, however, the particulates of the present invention provide for a crystalline microstructure in which the silicon domains (particles) have a particle size of less than about 5 μm.

There are a number of parameters which can affect the particle size and composition of the particulates in the atomization process. These include the design of the nozzle, the type of cooling gas, the gas pressure, flow rate and superficial velocity, and the amount of super heat of the alloy melt. Typical inert gases useful in cooling the atomized stream include helium, argon, and nitrogen. Other well known inert gases could also be used. Each gas has a different heat capacity and/or thermal conductivity, which can affect the rate of cooling. For example, a higher heat capacity or higher conductivity gas, such as helium, will provide a higher rate of cooling than a lower heat capacity/ conductivity gas under otherwise identical conditions. Flow rates of the gas can be adjusted to balance the relative amounts of convective and conductive heat transfer to result in the desired cooling rate. The particle size of the particulates can be controlled by the pressure of the atomization process, and the amount of super heat. The term "superheat" refers to the amount of thermal energy in the alloy above the heat of fusion.

Generally, the conditions of atomization and cooling are such as to produce particulates having a maximum particle size of less than about 90 microns, and an average particle size of less than about 50 microns, and preferably a particle size of from about 18 to about 35 microns. The size of the silicon particles within the aluminum matrix of the particulates is generally less than about 10 microns, desirably less than about 5 microns, and preferably less than about 3 microns. In highly preferred embodiments, it is desired that the silicon particles within the matrix are as small as possible, for example, about 5 μm or even less.

After the powder is formed, it is subjected to a compacting step whereby the particulates are placed in a container, tamped down and vibrated, and then subjected to vacuum to remove air and other gaseous materials. The vacuum is generally 10 torr or less absolute pressure, desirably about 1 torr or less and preferably about 0.50 torr or less absolute pressure. After vacuum is applied for a period of from about 1.5 to about 5 minutes, the compressed particulates are subjected to isostatic compression at a pressure of at least about 30,000 psi, desirably at least about 45,000 psi, and preferably at least about 60,000 psi. This isostatic compression takes place at a temperature of less than about 212° F. (100° C.), desirably less than about 122° F. (50° C.), and preferably less than about 77° F. (25° C.), i.e., about room temperature.

The resulting "green" billet is then vacuum sintered at a temperature which is a function of the particular alloy composition, and is such that during the sintering process the particulate microstructure is left substantially unaffected. By the term "substantially unaffected" is meant that while the majority of the sinter bonds are formed by metallic diffusion, a small amount of melting can occur, however, this amount does not change the physical properties of the particulate to an extent that would affect the strength of the subsequently formed article. Generally, the sintering temperature is within 50° F. (28° C.) of the solidus of the particular composition, but may be higher or lower depending on the sintering characteristics desired. The term "solidus" refers to the point of incipient melting of the alloy and is a function of the amount of alloying materials present, e.g. magnesium, silicon, etc. The vacuum under which sintering takes place is generally 100 torr or less absolute pressure, desirably 10 torr or less, and preferably about 1 torr or less absolute pressure.

The sintered billet may then be subjected to additional processing, such as extrusion or other hot working processes. In a preferred embodiment for forming a disk, the sintered billet is extruded. Extrusion has the advantage that strong metal particle to metal particle bonds are formed. As the sintered billet is extruded, the sintered particulates abrade against each other as they pass through the extrusion die. This abrading process removes the naturally occurring metal oxides on the outer surface of the aluminum atomized particle, exposing the underlying metal and allowing a strong metal to metal bond to be formed.

A preferred extrusion process includes provisions for maintaining extrusion die temperature within close tolerances, i.e. within about ±50° F. (280° C.) of a target temperature, desirably within about ±30° F. (17° C.), and preferably within about ±15° F. (8° C.) of a target temperature. The actual target temperature is itself a function of the particular alloy being extruded but is typically between about 930° F. (499° C.) and about 970° F. (521° C.).

Figure 3:
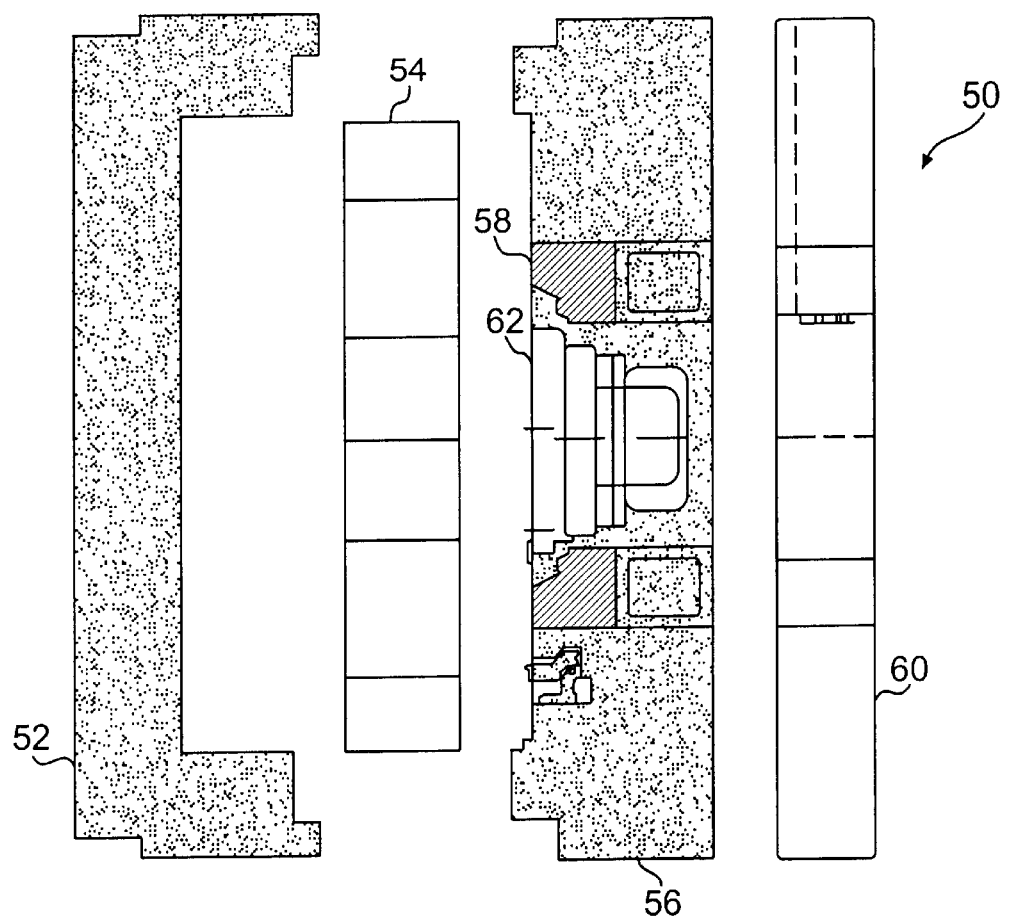
FIG. 3 is an exploded schematic of one embodiment of an extrusion die used in the invention.

As illustrated in FIG. 3, an extrusion die useful in the invention is indicated generally by the number 50 and includes a feeder plate 52, a mandrel/spider 54, an O.D bearing plate 56, a die insert holder assembly 58 and a backer plate 60. All of the sections are interference fitted to be in compression at the extrusion die temperature. The compression fit strengthens the die to prevent deflection of the die components. Within the die holder assembly 58 is fitted a bearing retainer assembly 62.

Figure 4:
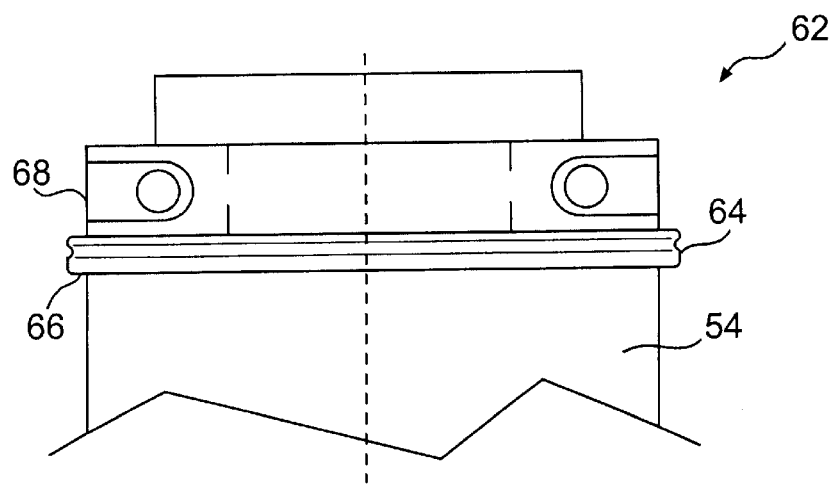
FIG. 4 is a schematic of a bearing retainer assembly of the extrusion die of FIG. 3.

FIG. 4 illustrates the bearing retainer assembly in detail. As shown in FIG. 4, a nonmetal insert 64 is positioned on a recessed surface 66 of the mandrel/spider 54. Over the insert 64 is placed a collar 68. Within the bearing retainer assembly is a pocket (not shown) for preworking the alloy prior to final extrusion through the O.D. bearing plate 56. The pocket has an entry angle of from about 30 to 32° and is positioned about 0.75 inches prior to the O.D. bearing plate 56. As the material passes through the pocket, it is preworked by shearing action. This aids in removal of the oxide layer from the particulates and in forming metal to metal bonds.

One or more, and preferably all of the above components of the extrusion die may be constructed of Inconel 718 or another alloy having a yield strength equivalent to or greater than that of Inconel 718 at 900–1000° F. (482–5380° C.) to prevent deflection or mandrel "stretch" due to high temperature creep. This is particularly important at die face pressures greater than 95000 psi at 900° F. (482° C.). At die pressures below this level, the extrusion die may typically be constructed of H13 tool steel.

The nonmetal insert 64 is preferably micrograined tungsten carbide (less than one micron diameter grain size) with a cobalt binder level between about 12% and 15%. This material exhibits a minimum transverse rupture strength of 600,000 psi. The use of Inconel 718 as the die insert holder with the tungsten carbide insert minimizes the possibility of cracking of the insert due to differences in coefficient of thermal expansion.

The extrusion container temperature is maintained within the same temperature limits as the extrusion die. In both cases, this may be accomplished by microprocessor controlled resistance band heaters strategically placed on the extrusion container. Temperature is measured by multiple thermocouples imbedded in the die and container adjacent the container surface (generally within ½ inch). Each portion of the extruder and die monitored by a thermocouple has independent temperature control.

In a particular embodiment of the invention, the alloy of the present invention is used to form a memory disk substrate for a computer hard drive. In this preferred application, the sintered billet is extruded in sheet form, and raw blanks are stamped from the sheet. The blanks are then polished, ground, nickel plated, and repolished. A magnetic layer and carbon layer are then sputtered on the polished nickel substrate. Memory disks formed by this process have a greater stiffness than monolithic aluminum, yet can be manufactured by existing processes. In addition to the inherently higher stiffness compared to memory disks of the prior art, disks manufactured from the alloy of the invention have a higher damping factor due to the presence of the silicon particles in the alloy.

Vibration dampening may be characterized by a dampening factor $\zeta$ where:

$$\zeta=[1/(2\pi f(T_2-T_1))]\ln[Y_1/Y_2]$$

Where $Y_1$ and $Y_2$ are two amplitudes taken on the free decay curve at times $T_1$ and $T_2$ and f is frequency.

A comparison of dampening factors for a 5000 series monolithic aluminum disk and a typical aluminum silicon disk (27% Si) of the invention is as follows:

|  | Prior Art 5xxx Al Disk | Al—Si Disk of the Invention |
| --- | --- | --- |
| $T_1$: | 54.78 | 53.23 |
| $Y_1$: | 223.7 | 186.1 |
| $T_2$: | 55.83 | 53.92 |
| $Y_2$: | 0.202 | 0.36 |
| f: | 350 Hz | 365 Hz |
| $\zeta$ | 0.304% | 0.395% |

The difference in $\zeta$ shows that the disk of the invention has a dampening factor 29.9% higher than that of a monolithic aluminum disk of the prior art.

Computer disks formed from the above-disclosed alloys can be spun at a rotational speed of up to 12,000 RPM with a flutter of 10 Å or less. In some embodiments, the flutter at this rotational speed is 5 Å or less, or even 2 Å or less. This level of flutter has heretofore been unattainable and is believed due to the combination of high stiffness and dampening unique to the alloys of the invention.

In addition to producing memory disks, the aluminum silicon alloy of the invention may be used to produce other well known parts of a computer disk drive. For example, an actuator arm can be produced by extrusion of a sintered billet to near net shape by semisolid forging of the billet to net shape, or by forging to near net shape. The advantages of producing an actuator arm with the alloy of the invention includes increased stiffness which minimizes contact of the arm with adjacently spaced disks in the assembled disk hard drive. Also, the disks and the actuator arm have similar or identical coefficients of thermal expansion.

The following example illustrates the invention.

EXAMPLE 1

A prealloyed Al26Si4CulMg aluminum alloy powder is used to prepare a memory disk. The silicon content is capable of obtaining a 14.5 MPSI modulus of elasticity (stiffness) which is slightly better than the "glass" alternative substrate material and is 45% stiffer than monolithic 5XXX alloy materials. Urethane elastomeric tooling is used to manufacture a 9.00" dia×14.00" L extrusion billet. This tooling includes a urethane bag, perforated stainless steel basket (to support the urethane bag), urethane top closure evacuation tube, latex banding tape, and sealing clamp. The urethane bag is placed inside the perforated stainless steel basket and the mold is filled with the atomized prealloyed aluminum powder. The mold is vibrated and the powder is tamped, followed by evacuation to less than 28 inches Hg vacuum.

The mold is then placed in a cold (25° C.) isostatic press and hydrostatically pressurized with oil to 55,000 psi +/−5,000 psi and dwell at pressure for 45 seconds, followed by decompression to atmospheric pressure and removal of the elastomer tooling from the press. The tooling is placed on a carriage and run through a pass through washer to remove oil entrained on the urethane bag from the isostatic press. The elastomer tooling is brought back to atmosphere and the "green billet" is removed. The green billet is placed in a vacuum furnace and the unit pumped down to 2.0×10−3 torr minimum vacuum pressure. The billet is heated to 250° F. in 15 minutes and is held at that temperature for 1 hour. The furnace temperature is then raised to 800° F. in 30 minutes and maintained for 90 minutes at 800° F. until the vacuum pressure is 2.0×103 torr minimum pressure (approx. 90 min.). The temperature is then raised to 1020° F.+/−20° F. in 30 minutes and held for 90 minutes. The billet is then cooled via convection cooling with an inert gas such as nitrogen, until the billet reaches a temperature of approximately 300° F. This cooling process minimizes oxidation damage to the furnace while providing low furnace cycle times.

Extrusion is carried out on a 3000 ton extrusion press employing the extrusion die design described above. The extrusion die includes inserts to produce a 5.500"×5.500"×0.090" wall right angle configuration. The extrusion parameters are: billet temperature 980°–1000° F., container temperature 950–970° F., extrusion die temperature 950–970° F., and extrusion exit speed of 5.5–6.0 feet/minute with a nitrogen gas "blanket" at the bearing area of the tooling. The right angle is split into five foot long rectangles and hot rolled at 800–875° F. at 18.5% maximum reduction per pass to produce a plate having a 0.045" final thickness. The plate is sheared into 4.00" squares and "hot straightened" by heating to 875–900° F. for 90 minutes at temperature following by cooling in "still air" to room temperature. The plate is then returned to the furnace and heated to 450° F. for 3 hours and again allowed to cool to room temperature. Another heating and cooling cycle is performed at 450° F. for 3 hours, and the plate is then stamped to produce a disk blank. The blank can be ground and polished in conventional processing equipment. The disk has the following physical properties:

Ultimate Tensile strength 39,800–41,000 PSI

Yield Strength 30,500–32,100 PSI

Elongation 1%

Modulus of Elasticity 14.37–14.49 MPSI

The disk exhibits less than 10 angstroms "flutter" throughout the entire range up to 12,000 RPM based on dynamic spin test. The natural resonant frequency for the Al26Si composition was 46.809 KHz compared to 38.305 KHz for a 5XXX monolithic industry standard memory disk substrate.

What is claimed is:

1. An extruded article formed by a process comprising the steps of
   (a) forming atomized particulates consisting essentially of from about 20 to about 40% by weight magnesium and the balance aluminum, the particulates having a particle size of from about 8 to about 35 microns and comprising a microstructure of silicon particles of from about 1 to about 10 microns in an aluminum matrix;
   (b) compacting the particulates in a mold;
   (c) subjecting the compacted particulates to a vacuum of less than about 10 torr absolute pressure to remove air and other gaseous materials from between the particulates and the mold;
   (d) isostatically compressing the particulates to a pressure of at least about 30,000 psi and at a temperature of less than about 100° C., thereby forming a green billet;
   (e) vacuum sintering the green billet under a vacuum of less than about 100 torr absolute pressure and/or an inert as environment at a temperature less than that which substantially affects the particulate microstructure, thereby forming a sintered billet; and (f) extruding the sintered billet and forming metal to metal bonds between the sintered particulates of the billet, thereby forming the extruded article.

2. An extruded article as claimed in claim 1, wherein the silicon particles have a particle size of from about 3 to about 7 μm.

3. An extruded article as claimed in claim 2, wherein the process for forming the articles includes subjecting the compressed particulates in step (c) to a vacuum of about 1 torr or less absolute pressure.

4. An extruded article as claimed in claim 3, wherein the vacuum of step (c) is about 50 μm absolute pressure.

5. An extruded article as claimed in claim 1, wherein the silicon particles have a particle size of from about 4.5 to about 5.5 μm.

6. An extruded article as claimed in claim 1, wherein the process for forming the article includes isostatically compressing the particulates in step (d) at a pressure of at least about 45,000 psi.

7. An extruded article as claimed in claim 6, wherein the pressure in step (d) is at least about 60,000 psi.

8. An extruded article as claimed in claim 4, wherein the silicon particles have a particle size of from about 4.5 to about 5.5 μm.

9. An extruded article as claimed in claim 8, wherein the process for forming the article includes isostatically compressing the particulates in step (d) at a pressure of at least about 60,000 psi.

10. An extruded article as claimed in claim 1, wherein the process for forming the article includes vacuum sintering the green billet in step (e) under a vacuum of less than about 1 torr absolute pressure and at a temperature of within about 50° F. of the solidus temperature.

11. An extruded article as claimed in claim 10, wherein the sintering temperature is within about 20° F. of the solidus temperature.

12. An extruded article as claimed in claim 1, wherein the article comprises a disk.

13. An extruded article as claimed in claim 12, wherein the disk has a stiffness of from about 14 to about 16 mpsi.

14. An extruded article as claimed in claim 9, wherein the article comprises a disk.

15. An extruded article as claimed in claim 14, wherein the disk has a flutter of less than about 10 Å when spun on its transverse axis at a speed of at least 10,000 rpm.

16. An extruded article as claimed in claim 1, wherein the article comprises an actuator arm for a computer hard disk drive.

17. An extruded article as claimed in claim 9, wherein the article comprises an actuator arm for a computer hard disk drive.

18. An extruded article as claimed in claim 1, wherein the extrusion step (f) comprises extruding the alloy through an extrusion die in which all die parts are in compression.

19. An extruded article as claimed in claim 1, wherein the extrusion step (f) comprises extruding the alloy through a die which includes a non-metal bearing insert.

20. An extruded article as claimed in claim 19, wherein the non-metal bearing insert comprises tungsten carbide.

21. An extruded article as claimed in claim 1, wherein the extrusion step (f) comprises extruding the alloy through a die having actively controlled heating to maintain a die temperature of greater than 900° F.

22. An extruded article as claimed in claim 2, wherein the extruded article is a disk.

23. An extruded article as claimed in claim 1, wherein the extrusion step (f) comprises extruding the alloy through a die formed of Inconel 718 or an alloy having equal or higher yield strength of Inconel 718 at a temperature of between 900° and 1000° F.

24. An actuator arm for a computer disk drive, comprising a metal alloy formed by a process comprising the steps of (a) forming atomized particulates consisting essentially of from about 20 to about 40% by weight silicon, up to 4% by weight magnesium and the balance aluminum, the particulates having a particle size of from about 8 to about 35 microns and comprising a microstructure of silicon particles of from about 1 to about 10 microns in an aluminum matrix;

(b) compacting the particulates in a mold;

(c) subjecting the compacted particulates to a vacuum of less than about 10 torr absolute pressure to remove air and other gaseous materials from between the particulates and the mold;

(d) isostatically compressing the particulates to a pressure of at least about 30,000 psi and at a temperature of less than about 100° C., thereby forming a green billet;

(e) vacuum sintering the green billet under a vacuum of less than about 100 torr absolute pressure and at a temperature less than that which substantially affects the particulate microstructure, thereby forming a sintered billet; and (f) working the sintered billet into the actuator arm.

25. An actuator arm as claimed in claim 24, wherein the working step (f) comprises semisolid forging to net shape.

26. An actuator arm as claimed in claim 24, wherein the working step (f) comprises forging to near net shape.

\* \* \* \* \*